(12) United States Patent
Kwan

(10) Patent No.: US 9,098,679 B2
(45) Date of Patent: Aug. 4, 2015

(54) RAW SOUND DATA ORGANIZER

(76) Inventor: Chi Leung Kwan, Hong Kong (HK)

( * ) Notice: Subject to any disclaimer, the term of this patent is extended or adjusted under 35 U.S.C. 154(b) by 247 days.

(21) Appl. No.: 13/471,466

(22) Filed: May 15, 2012

(65) Prior Publication Data

US 2013/0305909 A1 Nov. 21, 2013

(51) Int. Cl.
| | | |
|---|---|---|
| *G10H 7/00* | (2006.01) |
| *A63J 17/00* | (2006.01) |
| *G06F 21/10* | (2013.01) |
| *G10L 25/51* | (2013.01) |
| *G10H 1/00* | (2006.01) |
| G10G 1/00 | (2006.01) |

(52) U.S. Cl.
CPC .............. *G06F 21/10* (2013.01); *G10H 1/0008* (2013.01); *G10L 25/51* (2013.01); *G10G 1/00* (2013.01)

(58) Field of Classification Search
CPC ..... A63J 17/00; G10H 1/0016; G10H 1/0008; G10H 2220/066; G10H 2220/236; G10H 2220/015; G10G 1/00; A01B 12/006; G10L 25/51
USPC ............. 84/470 R, 464 R, 464 A, 477 R, 645
See application file for complete search history.

(56) References Cited

U.S. PATENT DOCUMENTS

| | | | | | |
|---|---|---|---|---|---|
| 3,698,277 | A | * | 10/1972 | Barra ........................... | 84/483.1 |
| 5,689,078 | A | * | 11/1997 | McClard ....................... | 84/600 |
| 5,723,802 | A | * | 3/1998 | Johnson et al. ............... | 84/609 |
| 6,353,167 | B1 | * | 3/2002 | Tuttle ........................... | 84/477 R |
| 6,380,471 | B2 | * | 4/2002 | Matsumoto .................. | 84/477 R |
| 6,831,220 | B2 | * | 12/2004 | Varme ........................... | 84/483.2 |
| 6,987,220 | B2 | * | 1/2006 | Holcombe .................... | 84/483.2 |
| 7,291,779 | B2 | * | 11/2007 | Hasebe ......................... | 84/477 R |
| 7,462,772 | B2 | * | 12/2008 | Salter ........................... | 84/477 R |
| 7,767,895 | B2 | * | 8/2010 | Johnston ...................... | 84/483.2 |
| 7,875,787 | B2 | * | 1/2011 | Lemons ........................ | 84/483.2 |
| 7,935,877 | B2 | * | 5/2011 | Lemons ........................ | 84/464 R |
| 8,449,360 | B2 | * | 5/2013 | Stoddard et al. ................. | 463/7 |
| 2004/0094017 | A1 | * | 5/2004 | Suzuki et al. .................. | 84/609 |
| 2004/0177745 | A1 | * | 9/2004 | Kayama ........................ | 84/609 |
| 2005/0262989 | A1 | * | 12/2005 | Franzblau .................... | 84/470 R |

OTHER PUBLICATIONS

Acid 4.0 Manual, Sonic Foundry, 2003.*

* cited by examiner

*Primary Examiner* — Jeffrey Donels

(57) ABSTRACT

A raw sound data organizer includes a processing unit configured to extract and convert an input into a digital format, and a display unit connected to the processing unit. The processing unit is configured to convert the input into a sequence of digital data and display the sequence of digital data in a form of a multi-dimensional color representation through the display unit. A raw sound data organizing method is also provided.

16 Claims, 10 Drawing Sheets

RAW SOUND DATA ORGANIZER

FIELD OF THE PATENT APPLICATION

The present patent application generally relates to sound data recording and management technologies and more specifically to a raw sound data organizer that is capable of analyzing an audio input, extracting data from the audio input, checking for potential copyright infringement, and presenting the data in an intuitive fashion.

BACKGROUND

Music is organized sounds. Sounds have high and low pitches and durations of various lengths. Different pitches sound together will deliver a harmonious effect. That is why music is different form noises of which the latter is unorganized sounds. A composer's work is to organize the sounds to achieve meaningful feelings to humans. Having submerged in music all the time, music composers may subconsciously share melodic patterns in their minds and exhibit similar patterns in their compositions. It is a composer's nightmare: when a composer comes up with a "he-thinks-very-great-chunk-of-sounds (a crude form of melody) and finds out that someone else had already written down and even registered a similar melody.

In reality, two songs may share the identical musical phrases. For example, the first 7 melodic notes of "Sound of Silence" composed by Paul Simon and "Sealed with a Kiss" composed by Gary Geld and performed by Jason Donovan are the same in pitches and durations. Therefore, during the music development process, especially at the final stage before publication, it is often necessary to run a checking process to avoid possible infringement of existing copyrighted musical work.

Similarly, the melodies are not exactly the same but close enough to cause a copyright infringement. To avoid this happening, a checking against already registered melodies is necessary. Checking by ear-listening is not practical.

SUMMARY

The present patent application is directed to a raw sound data organizer. In one aspect, the raw sound data organizer includes a processing unit configured to extract and convert an input into a digital format, and a display unit connected to the processing unit. The processing unit is configured to convert the input into a sequence of digital data and display the sequence of digital data in a form of a multi-dimensional color representation through the display unit.

The raw sound data organizer may further include a beat generator connected to the processing unit. The beat generator is configured to provide a rhythm as a basis for the generation of the input.

The digital data may include attributes of note name, start beat, note duration, amplitude, instrument being used, velocity, ambience, play mode, effect, and fading.

The raw sound data organizer may further include a data storage being connected to the processing unit and configured for storing the digital data. The data storage is configured to store copyrighted music data. The processing unit is configured to compare the digital data with the copyrighted music data stored in the data storage digitally by executing predetermined software so as to identify potential copyright infringement.

The raw sound data organizer may further include an audio input device, a MIDI port and a manual input port. The audio input device is configured to acquire an audio input from a user.

The MIDI port and the manual input port are configured to acquire data input from a user through a MIDI device and a manual input device respectively.

The multi-dimensional color representation may include a plurality of colored segments, each segment corresponding to one melodic note. Each segment has a first dimensional position and the timing of articulation of the melodic note is proportional to the first dimensional position. Each segment has a first dimensional length and the duration of the melodic note is proportional to the first dimensional length. Each segment has a second dimensional position and the pitch of the melodic note is in a proportional relationship with the second dimensional position. Each segment has a color and a pattern, the solfege name of the melodic note corresponding to the color and the pattern. Each segment has a third dimensional length, the amplitude of the melodic note is proportional to the third dimensional length, and the processing unit is configured to scroll the sequence of digital data in the form of the multi-dimensional color representation at a controllable speed.

In another aspect, the raw sound data organizer includes an input interface configured for acquiring an audio input or data input generated by a user; a processing unit connected to the input device and configured to extract and digitize data from the audio input; a data storage connected to the processing unit and configured for storing the digitized data; and a display unit connected to the processing unit. The processing unit is configured to convert the digitized data into a sequence of digital melodic notes and display the sequence of digital melodic notes in a form of a multi-dimensional color representation through the display unit.

The input interface may include a microphone, a MIDI port, and a manual input port. The multi-dimensional color representation may include a plurality of colored segments, each segment corresponding to one melodic note and having a color, a pattern, a first dimensional position, a first dimensional length, a second dimensional position, and a third dimensional length, the solfege name of the melodic note corresponding to the color and the pattern, the timing of articulation of the melodic note being proportional to the first dimensional position, the duration of the melodic note being proportional to the first dimensional length, the pitch of the melodic note being in a proportional relationship with the second dimensional position, the amplitude of the melodic note being proportional to the third dimensional length. The processing unit may be configured to scroll the sequence of digital melodic notes in the form of the multi-dimensional color representation at a controllable speed.

In yet another aspect, the present patent application provides a raw sound data organizing method. The method includes: acquiring an audio input generated by a user; extracting and digitizing data from the audio input; converting the digitized data into a sequence of digital melodic notes; displaying the sequence of digital melodic notes in a form of a multi-dimensional color representation; and storing the digitized data.

The raw sound data organizing method may further include providing a rhythm as a basis for the generation of the audio input, and characterizing a reference audio input for facilitating the subsequent extraction and conversion.

Each digital melodic note may include attributes of note name, start beat, note duration, amplitude, instrument used, velocity, ambience, play mode, effect, and fading.

The raw sound data organizing method may further include storing digitized copyrighted music data, and comparing the digitized data extracted from the audio input with the stored digitized copyrighted music data so as to identify potential copyright infringement.

The multi-dimensional color representation may include a plurality of colored segments, each segment corresponding to one melodic note and having a color and a pattern, the solfege name of the melodic note corresponding to the color and the pattern. Each segment has a first dimensional position, a first dimensional length, and a second dimensional position, the timing of articulation of the melodic note is proportional to the first dimensional position, the duration of the melodic note is proportional to the first dimensional length, and the pitch of the melodic note is in a proportional relationship with the second dimensional position. Each segment has a third dimensional length and the amplitude of the melodic note is proportional to the third dimensional length.

BRIEF DESCRIPTIONS OF THE DRAWINGS

DETAILED DESCRIPTION

Reference will now be made in detail to a preferred embodiment of the raw sound data organizer disclosed in the present patent application, examples of which are also provided in the following description. Exemplary embodiments of the raw sound data organizer disclosed in the present patent application are described in detail, although it will be apparent to those skilled in the relevant art that some features that are not particularly important to an understanding of the raw sound data organizer may not be shown for the sake of clarity.

Furthermore, it should be understood that the raw sound data organizer disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
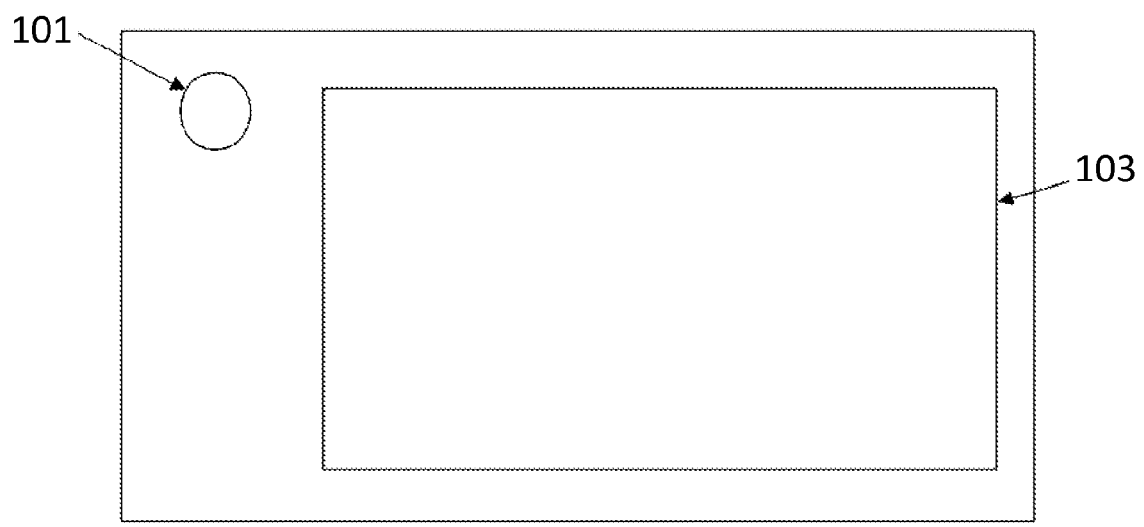
FIG. 1 is a front view of a raw sound data organizer according to an embodiment of the present patent application.

FIG. 1 is a front view of a raw sound data organizer according to an embodiment of the present patent application. Referring to FIG. 1, the raw sound data organizer includes a microphone 101, a data storage (not shown in FIG. 1) connected with the microphone, and a display unit 103 connected with the data storage. The microphone 101 is configured for capturing the input from a user. The storage is configured for storing digitized data (as illustrated in table 1 hereafter) and enabling content checking against existing melodies for potential copyright infringement identification. The display unit 103 is configured for display a graphical presentation of the digitized data. More specifically, the digitized data is converted into a sequence of digital data and the sequence of digital data are displayed in a form of a multi-dimensional color representation that will be described hereafter in more detail.

Figure 2:
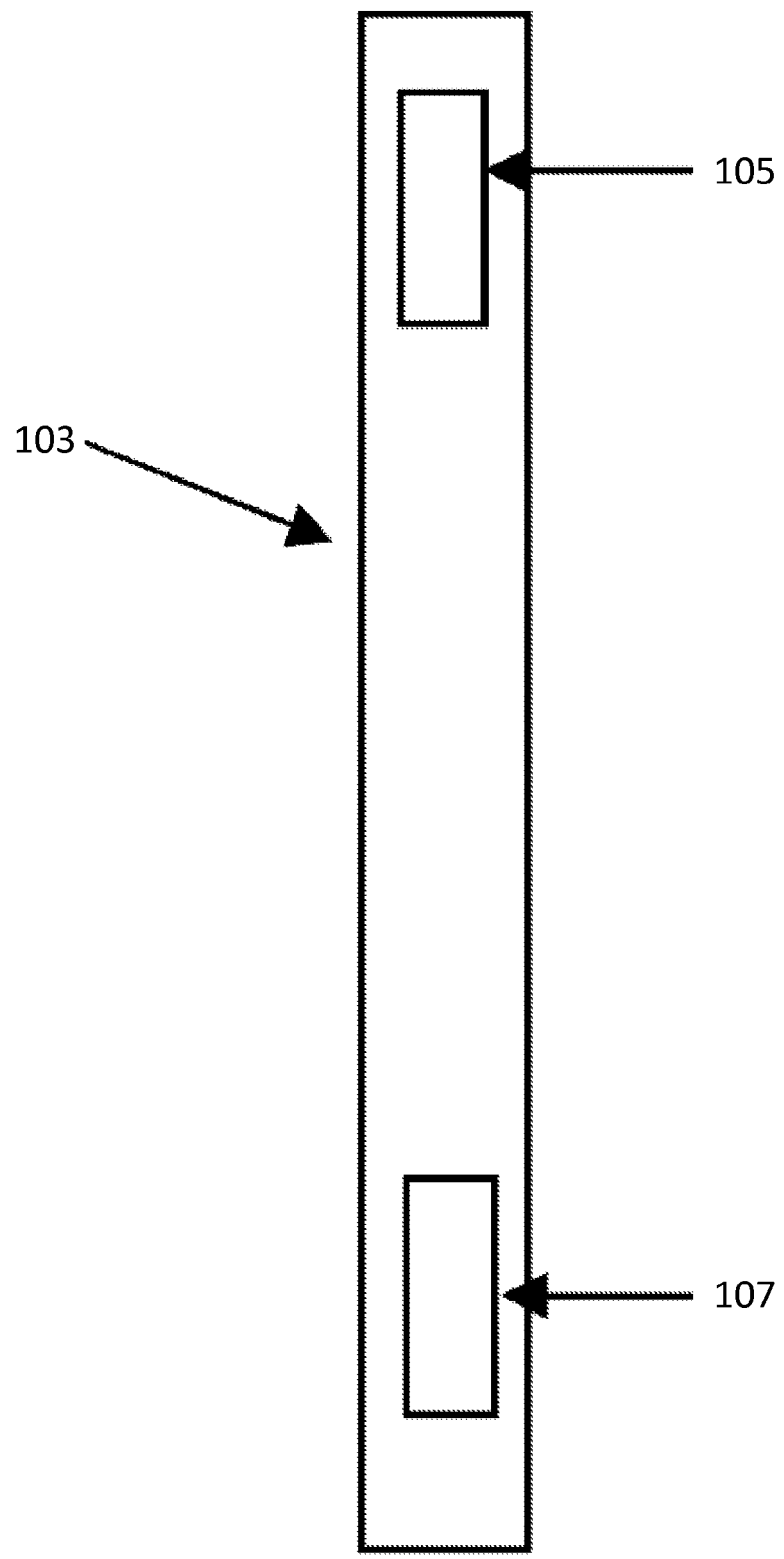
FIG. 2 is a side view of the raw sound data organizer depicted in FIG. 1.

FIG. 2 is a side view of the raw sound data organizer depicted in FIG. 1. Referring to FIG. 2, the display unit 103 of the raw sound data organizer includes a MIDI (Musical Instrument Digital Interface) I/O (Input/Output) port 105 and a manual input port 107.

Figure 3:
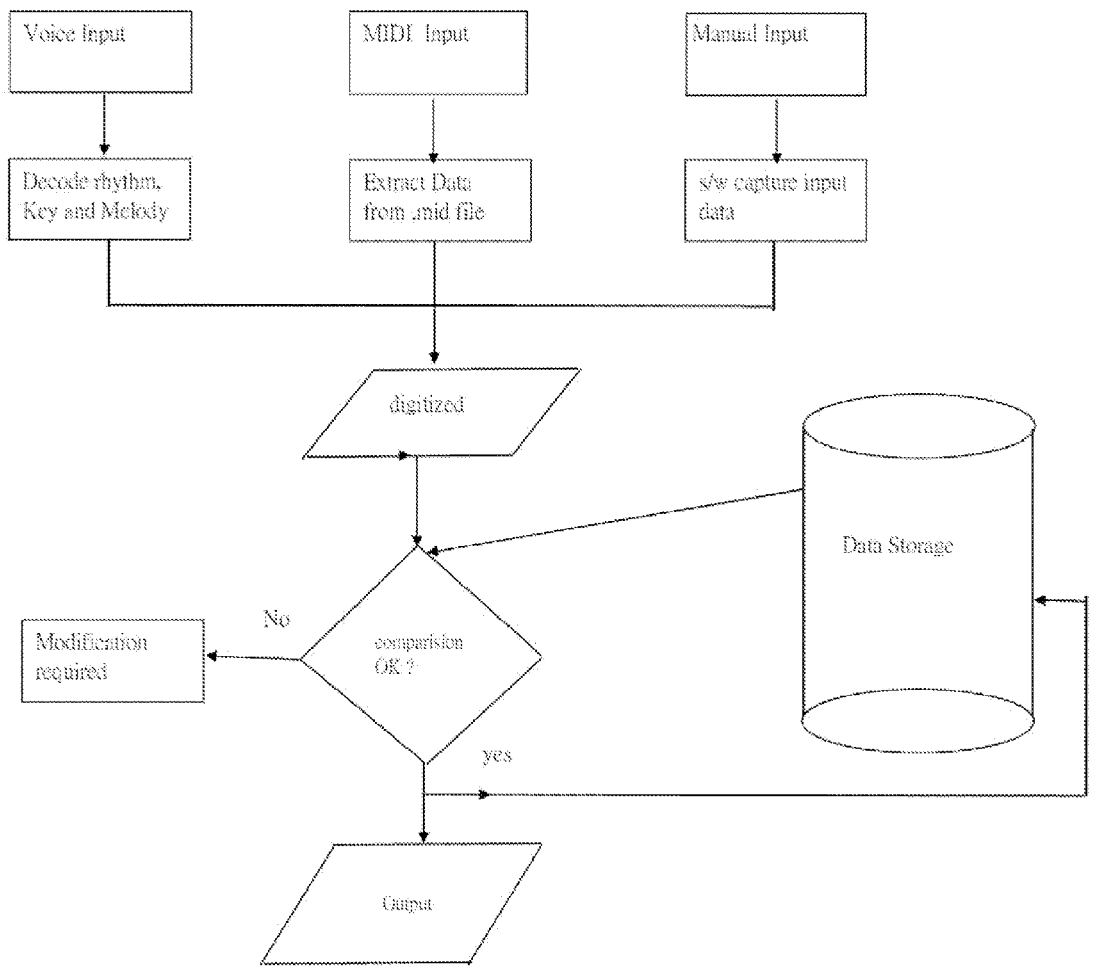
FIG. 3 is a block diagram that illustrates the operation of the raw sound data organizer depicted in FIG. 1.

FIG. 3 is a block diagram that illustrates the operation of the raw sound data organizer depicted in FIG. 2. Referring to FIGS. 1-3, the raw sound data organizer is configured to first take an input through the microphone 101, a MIDI input through the MIDI I/O port 105, or a manual input through the manual input port 107. Raw sound data (or raw data), such as the rhythm, and the melody and the loudness are decoded from the audio input and then digitized into a predefined format. Similarly, data is extracted from the .mid file, which comes from the MIDI input, and converted into the predefined format. As for the manual input, particular software is configured to capture the input data into the predefined format. A sample of the predefined format for the melody Happy Birthday is shown in FIG. 4A and Table 1.

To identify potential copyright infringement, the digitized data, which contains every note in a melody, is then compared, by proprietary software, with a collection of registered music data, which have been stored in the data storage, note by note. If any potential copyright infringement is identified, a modification is required. If not, the data is saved to the data storage and output to the display unit 103 in FIG. 2 to be displayed in the form of a predetermined representation that will be described hereafter.

It is understood that the extraction, digitization and comparison mentioned above is executed by a processing unit, which is also included in the raw sound data organizer and being connected with the microphone 101, the data storage and the display unit 103. In this embodiment, the processing unit is a specialized computer programmed to run particular software. It is further understood that the data storage is configured to store a large number of digitized copyrighted musical data in order to facilitate the potential infringement identification.

Figure 4A:
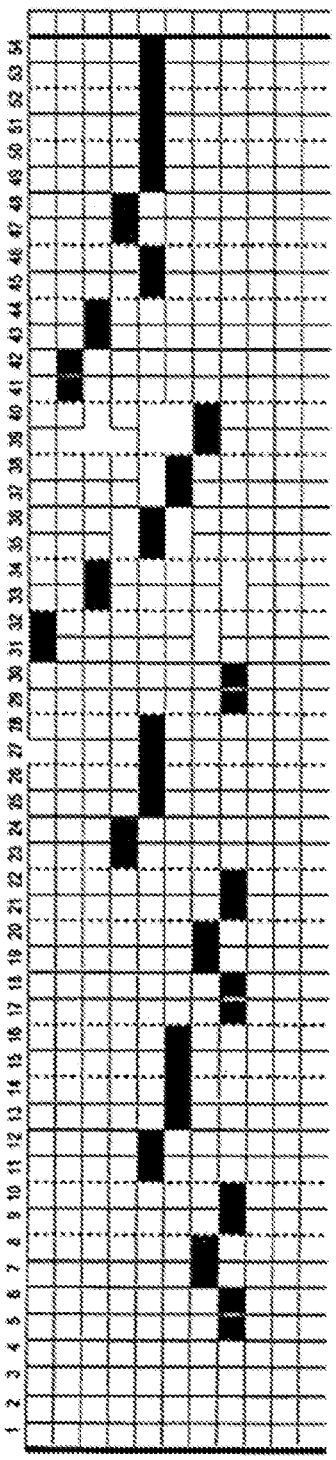
FIG. 4A shows a traditional score of the song Happy Birthday.
Figure 4A:
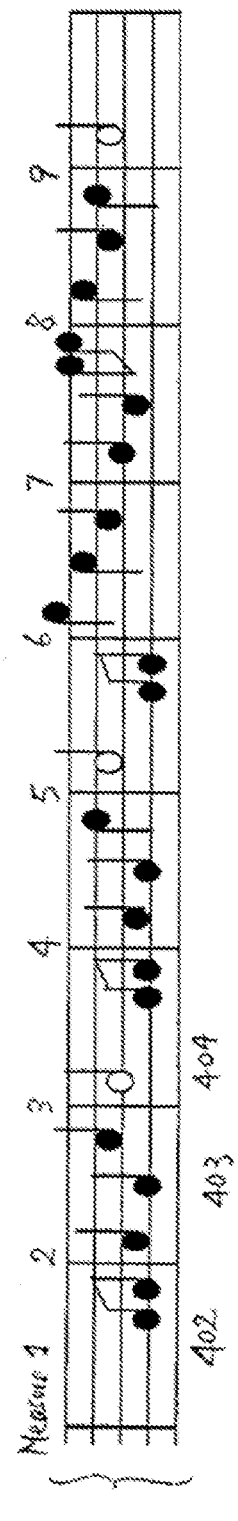

Before the user sings out his composition, he needs to sing a reference melody, which in this example is the song Happy Birthday, as shown in FIG. 4A. In label 401, the melody of Happy Birthday consists of 9 measures of 25 notes. There are 3 types of durations (eighth-notes (label 402), quarter-note (label 403), half-note (label 404)). The melody has a ¾ times tempo meaning 3 quarter notes per measure and Key of C major. The reason of that is that this tune can be sung effortlessly by most people and contains all 7 pitches of a diatonic scale.

5 5 6 5 1 7 55 6 5 2 1 55 5 3 1 7 6 44 3 1 2 1.

Soso la so do ti-ti soso la so re do-do soso so mi do ti la fafa mi do re do-do.

Biologically, children, men and women have different ranges of singing and thus different keys. By singing the reference melody Happy Birthday, the software can characterize that particular voice and analyze the subsequent singing effectively.

To denote the sequence of the notes, the following attributes are recorded: note name, start beat, and note duration. In addition to these 3 major attributes, other attributes are also used to indicate the feeling that the music is intended to express, such as amplitude, instrument used, velocity, ambience, play mode, effect, fading and etc. As an example, the Happy Birthday song in FIG. 4A has 25 melodic notes, as shown in Table 1.

TABLE 1

| No. | Note_name | Start_time | Duration | Amplitude |
|---|---|---|---|---|
| 1 | So | 5 | 1 | 1 |
| 2 | So | 6 | 1 | 1 |
| 3 | La | 7 | 2 | 3 |
| 4 | So | 9 | 2 | 2 |
| 5 | Do' | 11 | 2 | 1 |
| 6 | Ti | 13 | 4 | 3 |
| 7 | So | 17 | 1 | 1 |
| 8 | So | 18 | 1 | 1 |
| 9 | La | 19 | 2 | 3 |
| 10 | So | 21 | 2 | 2 |
| 11 | Re' | 23 | 2 | 1 |
| 12 | Do' | 25 | 4 | 3 |
| 13 | So | 29 | 1 | 1 |
| 14 | So | 30 | 1 | 1 |
| 15 | So' | 31 | 2 | 3 |
| 16 | Mi' | 33 | 2 | 2 |
| 17 | Do' | 35 | 2 | 1 |
| 18 | Ti | 37 | 2 | 2 |
| 19 | La | 39 | 2 | 2 |
| 20 | Fa' | 41 | 1 | 2 |
| 21 | Fa' | 42 | 1 | 2 |
| 22 | Mi' | 43 | 2 | 3 |
| 23 | Do' | 45 | 2 | 2 |
| 24 | Re' | 47 | 2 | 2 |
| 25 | Do' | 49 | 6 | 1 |

Another way of inputting compositions is by playing the tune on MIDI-instruments. Through these instruments, the names of the notes being pressed are sent to the .mid file, together with the time-of-press and time-of-release. These are MIDI instructions for the subsequent sound generation. Relevant information is extracted to suit the data format. Proprietary software is developed for this job. However, the quality of the product greatly depends on the skill of the player. If the player hits the wrong key or the duration is not accurate, the output will be deviated from the original score. Sometimes, the players tend to release the note earlier than indicated to make room for the next notes.

A manual input system is also included in the raw sound data organizer. Similar to typing words, note attributes are input through the guidance of the software. Although the process can be tedious, it is a very trustworthy way to input the data. For example:
Note_name, Start_time, Duration, Amplitude, Play_mode, Instrument_used, ambience, effect, fading.

The dataset is compared with millions of existing songs stored in the data storage. The purpose of the comparison is to identify any similarities for potential copyright infringement identification and report them right away.

In an embodiment, 32 consecutive notes are used for comparison since in the music industry, there must be sufficient identical notes to claim copyright infringement and a few identical notes can not cause infringement.

To increase the efficiency, the system has 2 levels of comparison. In the first level of comparison, the duration of notes are not considered. Only the sequence of 32 notes are compared in a whole set. Once there is another set of 32 consecutive notes are identified in an existing melody, the system jumps into a refined second level of comparison. In the refined level of comparison, the raw sound data organizer is configured to further examine on the durations of the notes individually. Reports of how close the notes are will be generated and the user will be informed if there is a likelihood of a similar pattern being found. It is noted that the algorithm of comparison that the software executes must work with the pre-defined data format.

In a post processing stage, the software is configured to analyze through the recorded notes, and to evaluate the Key of the song. Once the Key is known, the Color Solfege System is applied.

The rule of coloring is based on the solfege notation and illustrated in Table 2. Within an octave of 12 semitones (pitches), each has a unique color pattern. As a result, by this color pattern, every pitch can be sung.

TABLE 2

| Solfege Name | | Color Pattern | RGB Codes | | | Meshed |
|---|---|---|---|---|---|---|
| | | | Red | Green | Blue | |
| do | | Black | | | | |
| ti | | Purple | 145 | 86 | 194 | |
| te | | Purple + Mesh | 145 | 86 | 194 | yes |
| la | | Green | 204 | 255 | 153 | |
| le | | Green + Mesh | 204 | 255 | 153 | yes |
| so | | Blue | 0 | 255 | 255 | |
| se | | Blue + Mesh | 0 | 255 | 255 | yes |
| fa | | Brown | 153 | 51 | 0 | |
| mi | | Red | 255 | 0 | 0 | |
| me | | Red + Mesh | 255 | 0 | 0 | yes |
| re | | Orange | 255 | 153 | 0 | |
| ra | | Orange + Mesh | 255 | 153 | 0 | yes |
| do | | Black | | | | |

Note-name has different identities in different Keys.
Table 3 shows standard melodic notes in Key Eb Major and C Major.

TABLE 3

| Note-name | Key: Eb Major | Key: C Major |
|---|---|---|
| Eb5 | Do | |
| D5 | Ti | Re |
| C#5 | | |
| C5 | La | Do |
| B4 | | Ti |
| Bb4 | So | |
| A4 | | La |
| Ab4 | Fa | |
| G4 | Mi | So |
| F#4 | | |
| F4 | Re | Fa |
| E4 | | Mi |
| Eb4 | Do | |
| D4 | Ti | Re |
| C#4 | | |
| C4 (middle C) | La | Do |

When Eb is the Do (tonic), we call that scale Eb Major. The 7 scale notes within Eb Major are:
Eb (Do), F (Re), G (Mi), Ab (Fa), Bb (So), C (La) D (Ti).

When C is the do (tonic) we call that scale C Major. The 7 scale notes within C Major are
C (Do), D (Re), E (Mi), F (Fa), G (So), A (La) B (Ti).
Now, the note F4 will be a Re in the Scale of Eb Major but a Fa in the Scale of C Major.

In traditional scores, a F note is a F note regardless which Key it is in but in this new invention, a F note will be presented as a Re (colored Orange) in a melody of Key Eb Major, and a Fa (colored Brown) in a melody of Key C Major. Hence, the user jumps from a non-melodic, black and white world into a melodic, colorful world.

With reference to traditional score:
In My Chinese Heart (Key Eb) the F note is Re is colored Orange (501, 502 in FIG. 5A).
In Hey Jude (Key C) the F note is Fa and is colored Brown (610, 611 in FIG. 6).

Figure 7A:
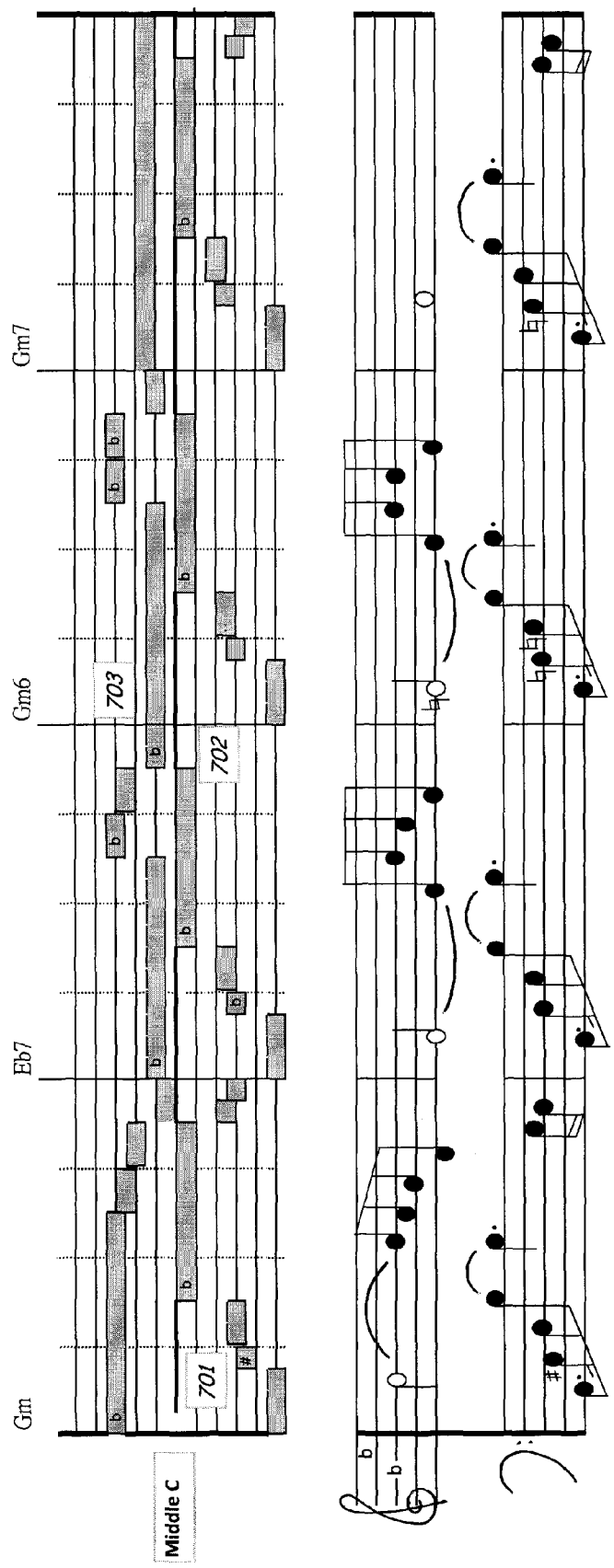
FIG. 7A shows an output of the raw sound data organizer depicted in FIG. 1 for the song Lady Sings the Blues in a 5 line style.

The traditional score has five lines and in-between spaces and the notes got their names by the positions. When a composer requires the sound Mi Fa So, he has to further decide the Key before he could put the notes correctly. Mi Fa So will be E, F, G in Key of C, but F#, G, A in the Key of D etc. This process is further complicated by the sharp, flat natural signs. Referring to FIG. 7A, when non-scale notes appear, the composer's intention is crystal-clear by the choice of colors. This is good for the sight-singing activities.

Figure 5A:
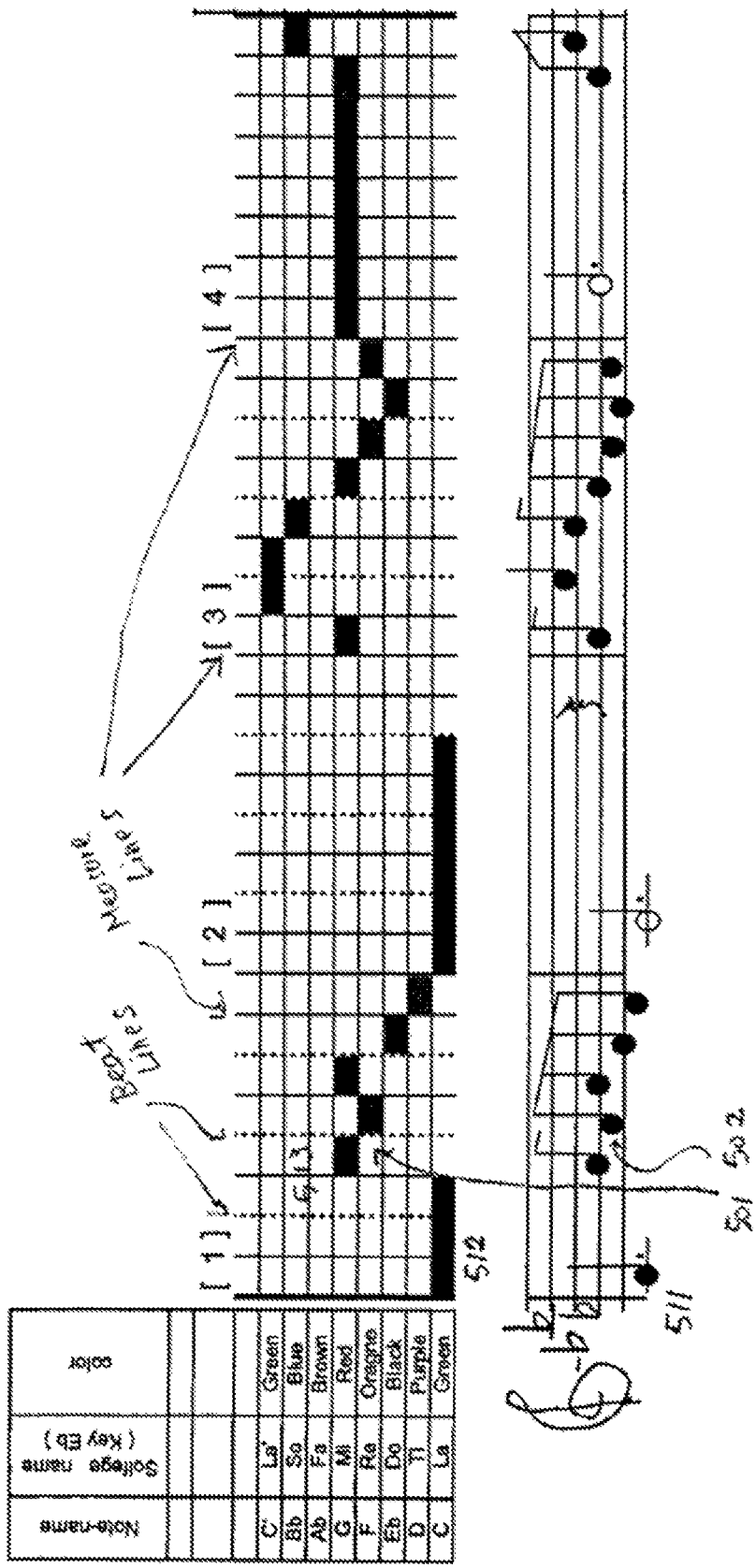
FIG. 5A shows a traditional score of the song My Chinese Heart.
Figure 6:
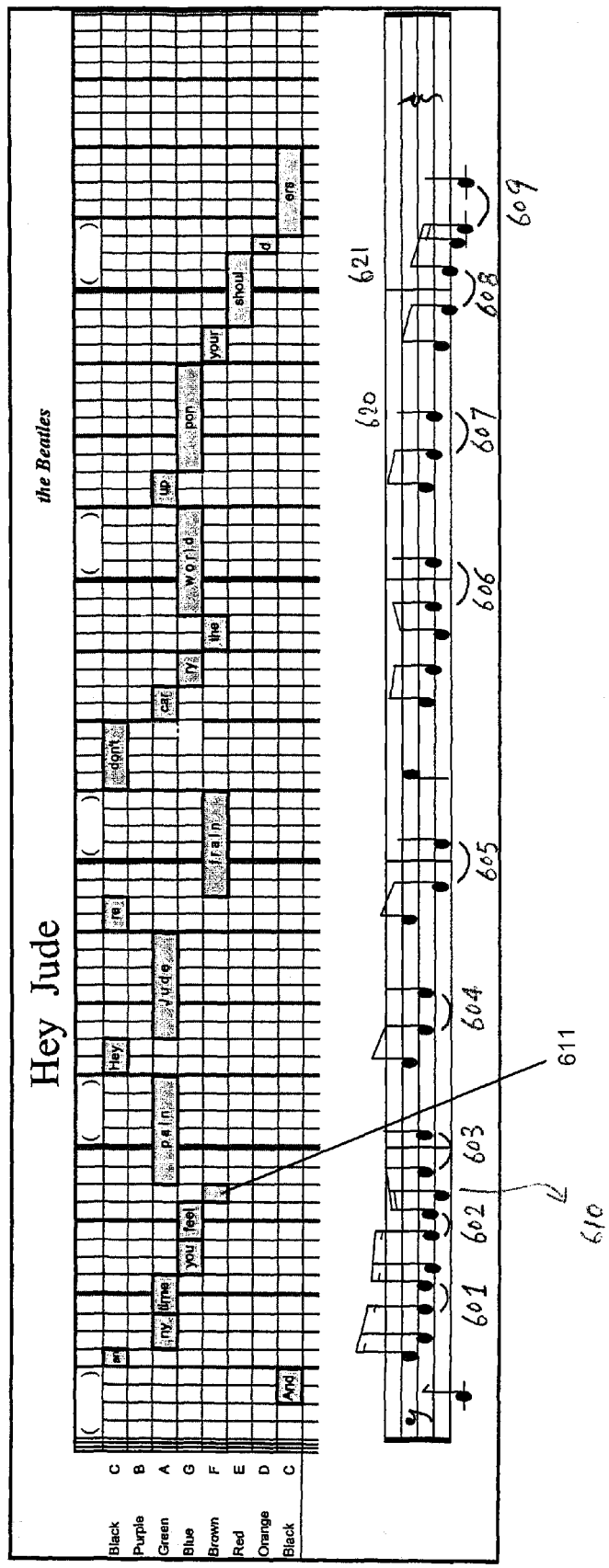
FIG. 6 shows an output of the raw sound data organizer depicted in FIG. 1 for the song Hey Jude with tied notes and embedded lyrics.

FIG. 5A and FIG. 6 show two examples of the song My Chinese Heart and Hey Jude with traditional scores and new presentation for easy comparison.

Pitch

On a 2 dimensional plan formed by the x axis (the horizontal axis) and the y axis (the vertical axis), 88 notes of different pitches (namely A0-C8) are displayed along the y axis. In FIG. 4A, only those sounding notes are shown for the sake of clarity. Each segment has a position in the y dimension. The pitch of the note corresponding to the segment is in a proportional relationship with the position in the y dimension.

Starting Time

Notes articulated at different start_time (reference to the start of the song) have different (but proportional) positions along the x axis (the horizontal axis). The time of articulation of each note, i.e., the start_time of the note, is proportional to the position of the corresponding segment in the x dimension.

Duration

The duration of each note is represented by the length of the corresponding segment. More specifically, the duration of a note is proportional to the length of the corresponding segment in the x dimension. This representation has a benefit that the user can, at a glance, know the duration without further interpretation of the symbols, such as the dotted-notes, tied-notes, and etc.

FIG. 5A shows 4 measures of "My Chinese Heart". Referring to FIG. 5A, the colored segments are positioned on a grid-pattern. Musical data that have equal durations are shown with equal lengths. Vertical solid-lines partition the grid into regions similar to the measures in the traditional score (label 501). Similarly, the vertical dash-lines further divide the measures into beats. In these examples, there are 4 beats per measure. The first measure contains 6 notes. The first note is a "dotted quarter C note occurred at first beat" (label 511). The second note is an eighth G note on the second-off beat. The third note is an eighth F note on the third beat, and so on. The first dotted quarter note takes (1.5 times ¼) ⅜ of a measure. This is presented in label 512. The second eighth note takes ⅛ of a measure (label 513).

The second measure contains two notes: one "dotted half note" and one "quarter rest note". The first note is a dotted half C note on the first beat. As the dotted notation means the value of the duration times 1.5, so that C notes takes ½ measure times 1.5 which equals ¾ measure. In this embodiment, the note takes ¾ of the length. Similarly the rest note takes up ¼ of the length.

In the example of Hey Jude (as shown in FIG. 6), there are 5 measures and 32 notes. 9 of them are tied-notes (labels 601-609). Tied notes are notes crossing the beat/measure lines (labels 620, 621) and they make the timings unnecessarily complex. The tied notes make music vivacious. When compared with this embodiment, it is evident that these notes are neatly presented. It is noted that the number of the notes is reduced from 32 to 23 without losing information.

Amplitude

Figure 4B:
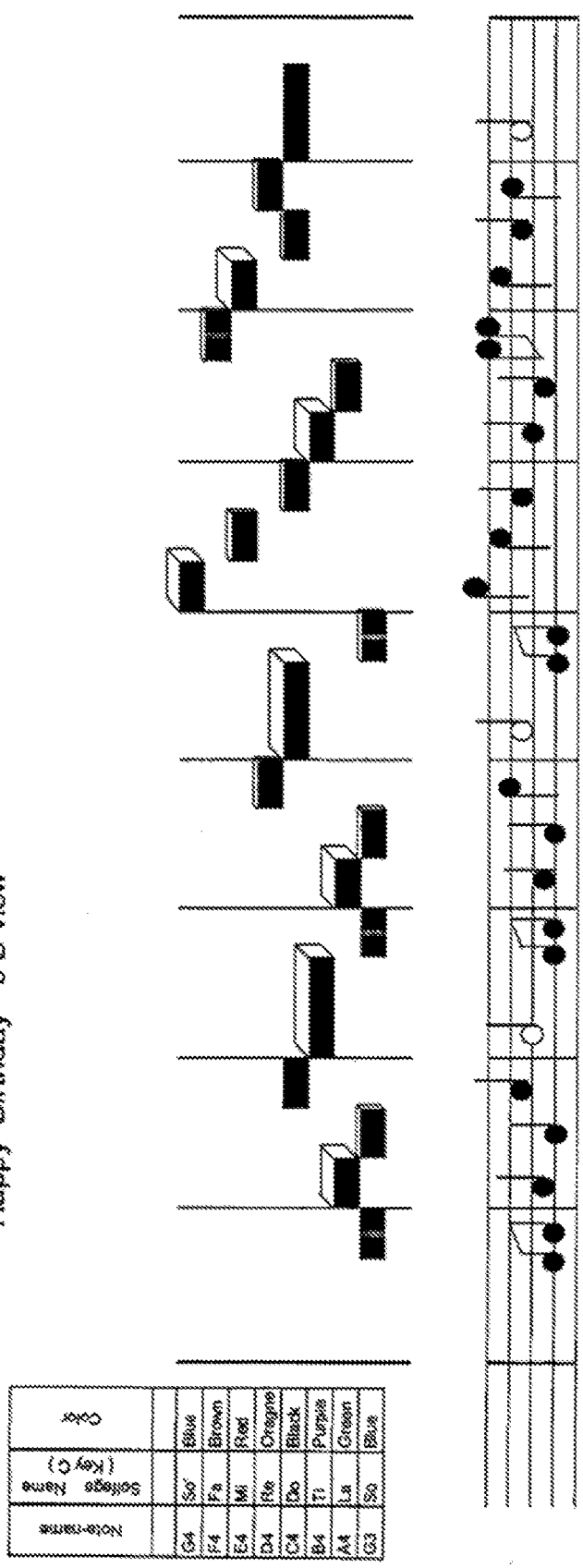
FIG. 4B shows an output of the raw sound data organizer depicted in FIG. 1 for the song Happy Birthday.
Figure 5B:
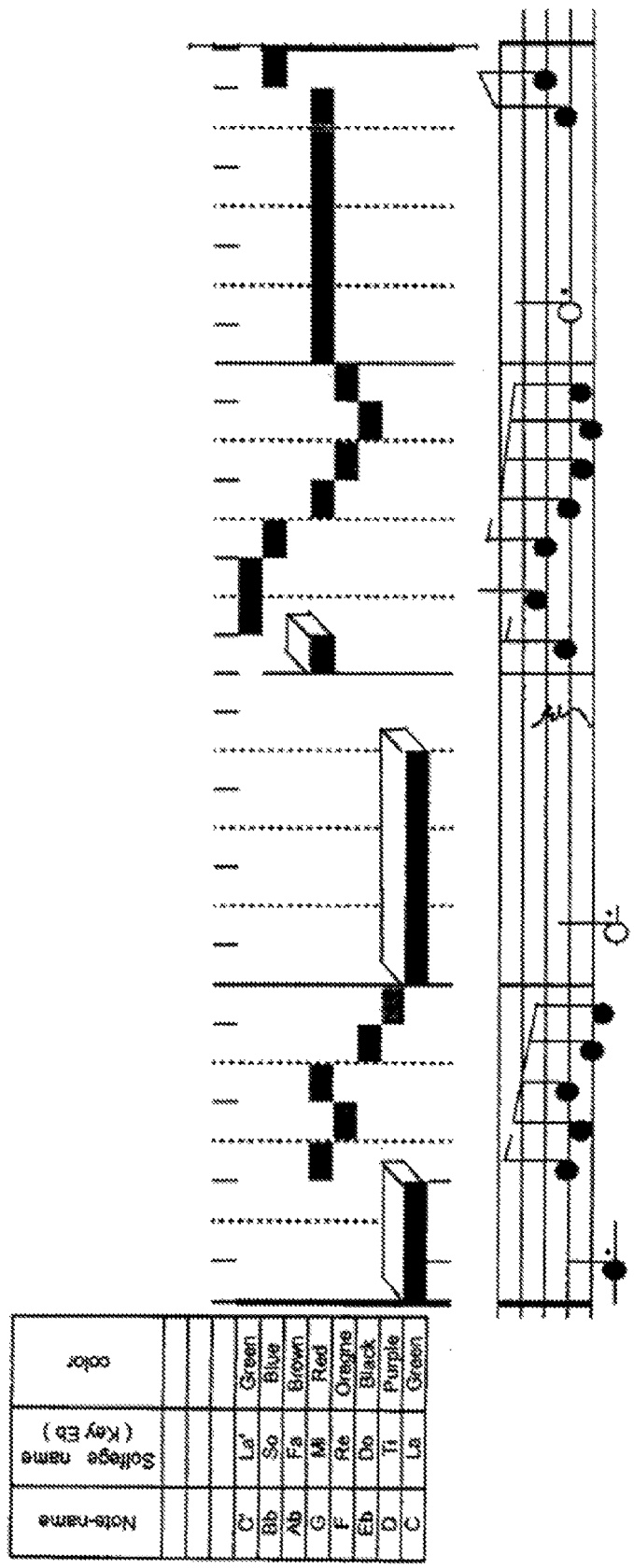
FIG. 5B shows an output of the raw sound data organizer depicted in FIG. 1 for the song My Chinese Heart.

FIG. 4B shows an output of the raw sound data organizer depicted in FIG. 1 for the song Happy Birthday. FIG. 5B shows an output of the raw sound data organizer depicted in FIG. 1 for the song My Chinese Heart in a 3D style. Referring to FIG. 4B, in this embodiment, the representation has a three dimensional view and the amplitude of each note is proportional to the length in the z dimension (the third dimension) of the segment corresponding to the note.

The segments shown in FIGS. 4A, 4B, 5A, 5B, 6, 7A, and 7B are black and white due to the format requirements imposed on this patent application, but in the actual raw sound data organizer of the above embodiments, the segments are displayed in 12 different available colored patterns according to a predetermined rule (as shown in Table 2).

In this embodiment, with the Colored Solfege Notation being introduced to the melodic notes, the viewers can sing while the data (the sequence of digital melodic notes in the form of the above-mentioned multi-dimensional color representation) is seamlessly scrolling in front of their eyes at a controllable speed. Such feature is very convenient for live performances. It is understood that the scrolling of the segments at a controllable speed along with the music being played is controlled by the processing unit as well. It is noted that illustrative features such as blinking, patterning and embedding lyrics (as shown in FIG. 6) onto the colored segments may be implemented by the processing unit to enhance the information delivered to the user.

The display output of the raw sound data organizer may vary according to the users of different categories.

Figure 7B:
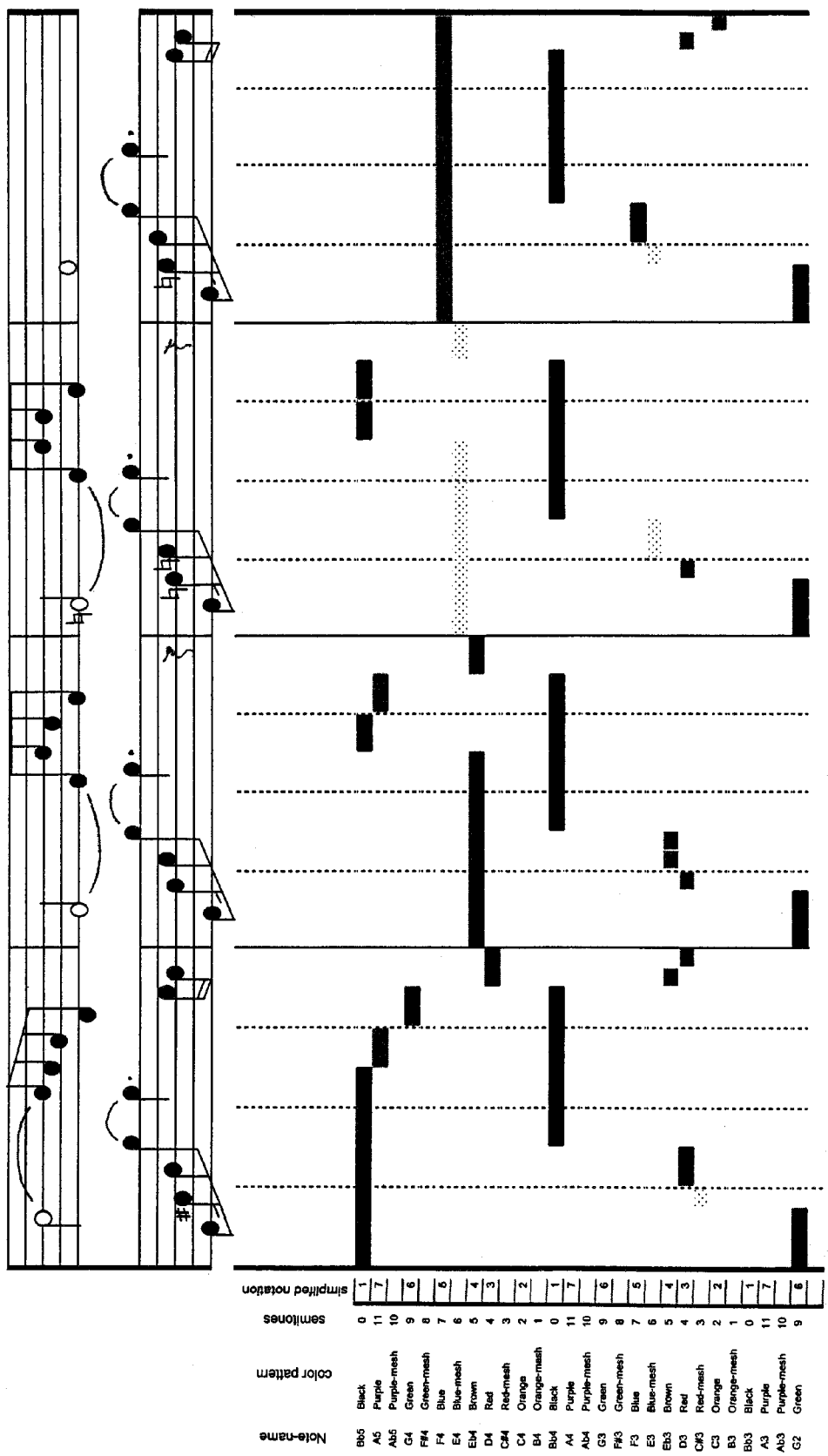
FIG. 7B shows an output of the raw sound data organizer depicted in FIG. 1 for the song Lady Sings the Blues in a 12 semitone style.

1. FIG. 7A and FIG. 7B show an output on the display unit of the raw sound data organizer according to another embodiment of the present patent application. Referring to FIG. 7A, for existing score users who are accustomed to the 5-line #, b, and natural signs, the system is configured to deliver a similar outlook. The timings are inevitably denoted by segment lengths. The #, b notations are annotating locally individually and not globally on the start (labels 701, 702, 703). Hence, the user knows exactly what notes to play.

2. For monophonic users, only the melody is required. They can choose to "sing" the melodies. Every note is labeled with the colors and solfege names and the player actually sees the melodic sound of the note. The display output shown in FIG. 4B is an example in this category.

3. FIG. 7B shows an output on the display unit of the raw sound data organizer according to another embodiment of the present patent application. Referring to FIG. 7B, for polyphonic users in harmonic analysis or studying, all 12 semitones within an octave are displayed to reveal the absolute separations between notes in semitones.

In the above embodiments, with the raw sound data organizer, the sound data is recorded, analyzed and presented to the user in various ways. The convenience of What You Play Is What You See is achieved. In addition, the raw sound data organizer is configured to compare the digitized sound data with existing copyrighted music to identify potential copyright infringement.

While the present patent application has been shown and described with particular references to a number of embodiments thereof, it should be noted that various other changes or modifications may be made without departing from the scope of the present invention.

What is claimed is:

1. A raw sound data organizer comprising:
   a processing unit configured to extract and convert an input into a digital format; and
   a display unit connected to the processing unit, the display unit comprising a screen having a first axis, a second axis and a third axis which are perpendicular to each other, the first axis being a horizontal axis and the second axis being a vertical axis; wherein:
   the processing unit is configured to convert the input into a sequence of digital data and display the sequence of digital data in a form of a multi-dimensional color representation on the screen;
   the processing unit is configured to scroll the sequence of digital data in the form of the multi-dimensional color representation at a controllable speed;
   the multi-dimensional color representation comprises a plurality of colored cuboids each corresponding to one melodic note;
   the colored cuboids are of substantially unified height and distributed at different vertical displacement levels in a direction of the vertical axis;
   each of the colored cuboids extends along a direction of the horizontal axis with variable length that is proportional to a duration of the melodic note; and
   each of the colored cuboids extends along a direction of the third axis with variable length that is proportional to an amplitude of the melodic note.

2. The raw sound data organizer of claim 1, wherein each of the colored cuboids comprises:
   a first dimensional position in the direction of the horizontal axis;
   a second dimensional position in the direction of the vertical axis; and
   the first dimensional position is proportional to a timing of articulation of the melodic note; and
   the second dimensional position is proportional to a pitch of the melodic note.

3. The raw sound data organizer of claim 1 further comprising a beat generator connected to the processing unit, wherein the beat generator is configured to provide a rhythm as a basis for the generation of the input.

4. The raw sound data organizer of claim 1, wherein the digital data comprises attributes of note name, start beat, note duration, amplitude, instrument being used, velocity, ambience, play mode, effect, and fading.

5. The raw sound data organizer of claim 1 further comprising a data storage being connected to the processing unit and configured for storing the digital data, wherein the data storage is configured to store copyrighted music data, and the processing unit is configured to compare the digital data with the copyrighted music data stored in the data storage digitally by executing predetermined software so as to identify potential copyright infringement.

6. The raw sound data organizer of claim 1 further comprising an audio input device, a MIDI port and a manual input port, wherein the audio input device is configured to acquire an audio input from a user, and the MIDI port and the manual input port are configured to acquire data input from a user through a MIDI device and a manual input device respectively.

7. The raw sound data organizer of claim 1, wherein each of the colored cuboids comprises a color and a pattern, a solfege name of the melodic note corresponding to the color and the pattern.

8. A raw sound data organizing method comprising:
   acquiring an audio input generated by a user;
   extracting and digitizing data from the audio input;
   converting the digitized data into a sequence of digital melodic notes;
   displaying the sequence of digital melodic notes in a form of a multi-dimensional color representation on a screen having a first axis, a second axis and a third axis which are perpendicular to each other, the first axis being a horizontal axis and the second axis being a vertical axis;
   scrolling the sequence of digital melodic notes in the form of the multi-dimensional color representation at a controllable speed; and
   storing the digitized data;
   wherein the multi-dimensional color representation comprises a plurality of colored cuboids each corresponding to one melodic note;
   the colored cuboids are of substantially unified height and distributed at different vertical displacement levels in a direction of the vertical axis;
   each of the colored cuboids extends along a direction of the horizontal axis with variable length that is proportional to a duration of the melodic note; and
   each of the colored cuboids extends along a direction of the third axis with variable length that is proportional to an amplitude of the melodic note.

9. The raw sound data organizing method of claim 8, wherein each of the colored cuboids comprises:
   a first dimensional position in the direction of the horizontal axis;
   a second dimensional position in the direction of the vertical axis; and
   the first dimensional position is proportional to a timing of articulation of the melodic note; and
   the second dimensional position is proportional to a pitch of the melodic note.

10. The raw sound data organizing method of claim 8 further comprising providing a rhythm as a basis for the generation of the audio input, and characterizing a reference audio input for facilitating the subsequent extraction and conversion.

11. The raw sound data organizing method of claim 8, wherein each digital melodic note comprises attributes of note name, start beat, note duration, amplitude, instrument used, velocity, ambience, play mode, effect, and fading.

12. The raw sound data organizing method of claim 8 further comprising storing digitized copyrighted music data, and comparing the digitized data extracted from the audio input with the stored digitized copyrighted music data so as to identify potential copyright infringement.

13. The raw sound data organizing method of claim 8, wherein each of the colored cuboids comprises a color and a pattern, a solfege name of the melodic note corresponding to the color and the pattern.

14. A raw sound data organizer comprising:
   an input interface configured for acquiring an audio input or data input generated by a user;
   a processing unit connected to the input device and configured to extract and digitize data from the audio input;

a data storage connected to the processing unit and configured for storing the digitized data; and a display unit connected to the processing unit, the display unit comprising a screen having a first axis, a second axis and a third axis which are perpendicular to each other, the first axis being a horizontal axis and the second axis being a vertical axis; wherein:

the processing unit is configured to convert the digitized data into a sequence of digital melodic notes and display the sequence of digital melodic notes in a form of a multi-dimensional color representation on the screen;

the processing unit is configured to scroll the sequence of digital melodic notes in the form of the multi-dimensional color representation at a controllable speed;

the multi-dimensional color representation comprises a plurality of colored cuboids each corresponding to one melodic note;

the colored cuboids are of substantially unified height and distributed at different vertical displacement levels in a direction of the vertical axis;

each of the colored cuboids extends along a direction of the horizontal axis with variable length that is proportional to a duration of the melodic note; and each of the colored cuboids extends along a direction of the third axis with variable length that is proportional to an amplitude of the melodic note.

15. The raw sound data organizer of claim 14, wherein each of the colored cuboids comprises:

a first dimensional position in the direction of the horizontal axis;

a second dimensional position in the direction of the vertical axis; and the first dimensional position is proportional to a timing of articulation of the melodic note; and the second dimensional position is proportional to a pitch of the melodic note.

16. The raw sound data organizer of claim 14, wherein the input interface comprises a microphone, a MIDI port, and a manual input port; and the processing unit is configured to scroll the sequence of digital melodic notes in the form of the multi-dimensional color representation at a controllable speed.

* * * * *